May 29, 1956  W. J. KICKBUSH  2,747,344
PORTABLE LAWNMOWER SHARPENER
Filed Feb. 12, 1953
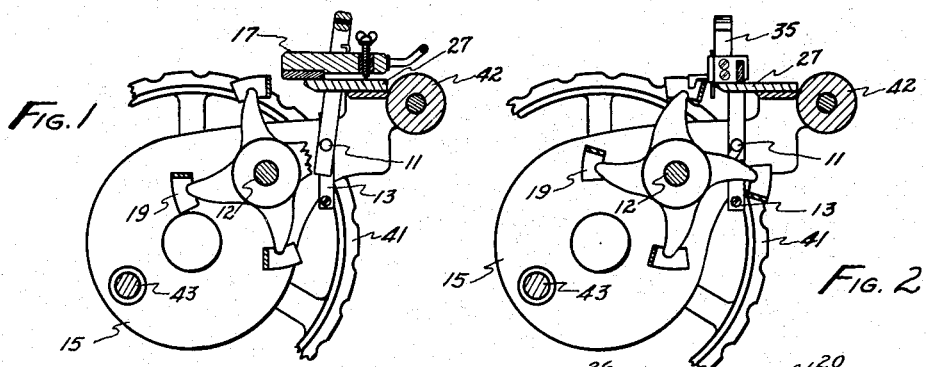
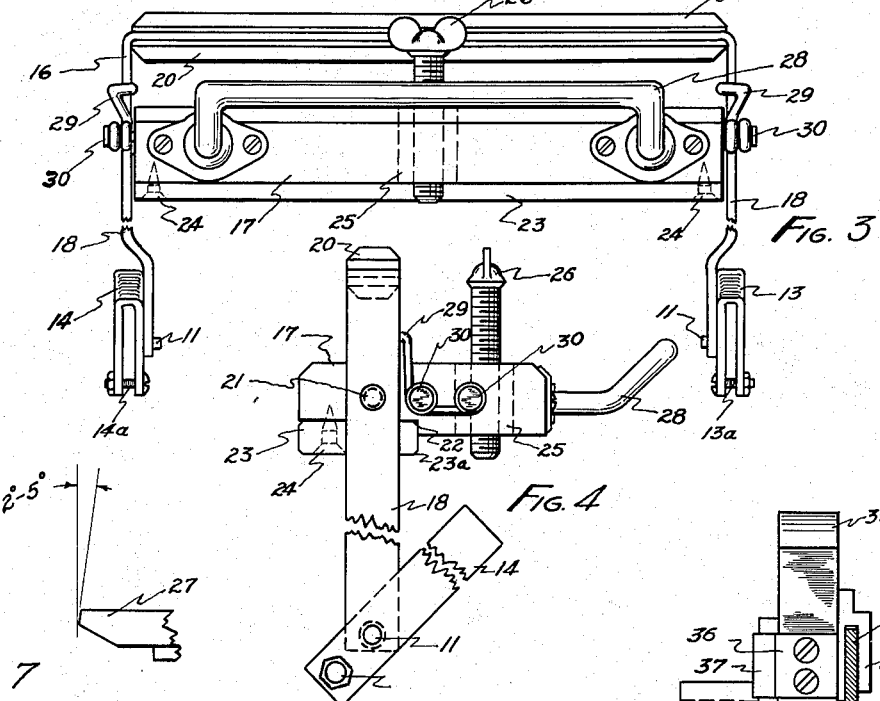
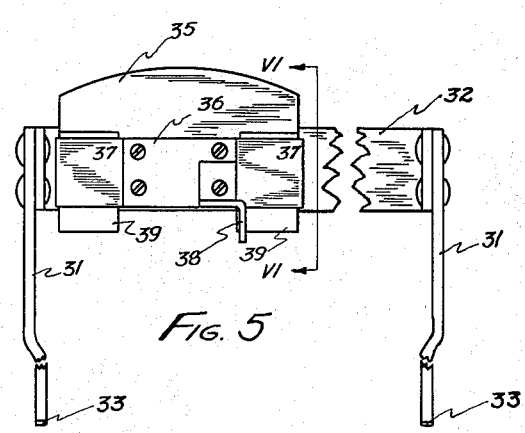
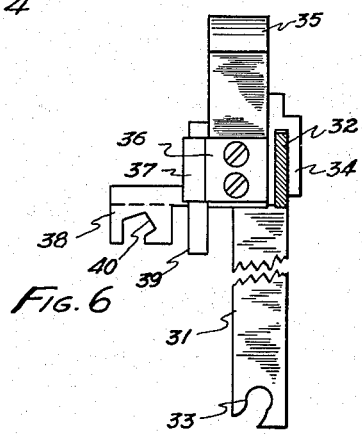
INVENTOR
WILLIAM JULIUS KICKBUSH
BY
Dean Lawrence
ATTORNEY

United States Patent Office 2,747,344
Patented May 29, 1956

2,747,344

PORTABLE LAWNMOWER SHARPENER

William Julius Kickbush, Owosso, Mich.

Application February 12, 1953, Serial No. 336,518

2 Claims. (Cl. 51—250)

The present invention is a portable lawnmower sharpener for conventional lawnmowers having spiral rotating blades which operate to shear grass in relation to a fixed cutting bar blade.

Heretofore, the sharpening of such lawnmowers was accomplished by individually sharpening each blade which resulted in inaccuracies and serious misalignment. Machine sharpening has yielded satisfactory results but requires the dismantling of the lawnmower and adjustments requiring the attention of skilled operators. Portable means have been devised which have yielded non-uniform sharpening or failures in blade alignment. None of the prior portable devices, to my knowledge, have utilized a blade sharpening operation in connection with a device which properly dresses the cutting bar blade.

It is, therefore, the object of my invention to provide a simply produced, easily used portable sharpening unit available to all size lawnmowers, which can be operated by simple manipulation, and which does not require dismantling of the mower.

A further object of my invention is to provide a sharpening device having replaceable sharpening surfaces capable of accurate alignment with the mower blades so as to yield a uniformly accurate sharpness.

It is a further object of my invention to provide a cutting bar blade sharpener which uniformly dresses the cutting bar blade of lawnmowers in positive alignment with the spiral blades.

Other objects and advantages will become apparent to those skilled in the art as the description proceeds.

In the drawings:

Figure 1 is a cutaway end elevation of an inverted conventional lawnmower showing the rotating blade sharpener attached.

Figure 2 is a cutaway end elevation of an inverted conventional lawnmower showing the cutting bar blade sharpener atached.

Figure 3 is a rear elevation of the rotary blade sharpener.

Figure 4 is a side elevation of the rotary blade sharpener.

Figure 5 is a front elevation of the cutting bar blade dresser mounted on the guide bar.

Figure 6 is a cross section of the guide bar taken along line VI—VI showing the engagement of the cutting bar blade dresser with the guide bar.

Figure 7 is a partial end elevation of the stationary cutting bar after proper dressing.

Referring more specifically to said drawings:

As hereinafter used "front" shall have application to the direction in which the lawnmower is normally used, and directional reference with respect to the sharpener and dresser shall be referred to their positioning (as shown in Figs. 1 and 2) mounted upon an inverted mower.

As indicated in Figs. 1 and 2 of the drawing showing the lawnmower in an inverted position, pivots 11 are aligned offset from and parallel with the rotary spiral blade shaft 12 and held by means of a right hand mounting clevis 13 and a corresponding left hand mounting clevis 14 which clamp over the frame extension 15 of the lawnmower. It is understod that these pivots 11 may be otherwise provided, as by the affixation to the frame 15 in the construction of the lawnmower or by permanently affixing suitable pins to the frame 15, without departing from the spirit of the invention. Clevis bolts 13a and 14a are provided connecting the open ends of corresponding clevises 13 and 14 and provide convenient means for removably fixing the said clevises 13 and 14 to the mower frame 15. The pivots 11 thus establish the attachment means for the rotary spiral blade sharpener and cutting bar blade dresser hereinafter described.

The spiral rotary blade sharpener consists of an arbor frame 16 of stiff metal as best shown in Figs. 3 and 4 and is of such configuration as to clear the sharpener body 17, so that the legs 18 of the arbor frame 16 extend below the body 17. The legs 18 are bent slightly so as to clear the mower frame extension 15 and the rotary spiral blades 19. The bail-like extension of the arbor frame 16 which extends over the body 17 is provided with stiffeners 20 suitably attached at regular intervals to the arbor frame 16. The stiffeners 20 may be made of wood, although plastic or metal suitably fashioned will be satisfactory, the function of the stiffeners 20 being to assure that misalignment does not occur by way of bending in the upper part of the arbor frame 16. The ends of the legs 18 are pierced as best indicated by the hidden edge lines in Fig. 4 to accommodate the clevis pivots 11. In this manner the legs 18 may be sprung over the clevis pivots 11 so that the arbor frame 16 is pivotally attached to the lawnmower and aligned with the blades 19 and shaft 12 thereof. Fig. 3 shows the positioning of the arbor frame 16 upon the clevises 13 and 14. At equal distances from the clevis pivots 11, and up the arbor frame legs 18 are arbor pivot pins 21 disposed on either end of the sharpener body 17. The arbor pivot pins 21 attach the body 17 through the arbor frame 16 and establish an axis about which the sharpener body 17 can rotate with respect to the arbor frame 16. The body 17 is of generally rectangular configuration and is provided with a step 22 on its front underside (as shown in Fig. 4) to accommodate an abrasive plate 23 and abrasive plate retaining means 24, here shown as countersunk screws (see Figs. 3 and 4), which assure a rigid holding of the abrasive plate 23 and positive alignment of the abrasive plate 23 with the body 17. The abrasive plate 23 may be a grit stone, carborundum, or a flat file, but experience has indicated that the file surface is the most satisfactory as will be hereinafter referred to. The abrasive plate 23 extends substantially the length of the body 17 and is of such thickness as to extend slightly beyond the body 17 out of the step 22. The leading edges of the abrasive plate 23 are given a slight chamfer 23a to prevent damage to the spiral rotating blades 19 by accidental engagement. In the center of the body 17 is a threaded insert 25 through which is threadably operative a thumb screw adjuster 26. The thumb screw 26 is located slightly behind the axis established through the body 17 by the arbor pivot pins 21 and passes through the body 17 to emerge from the body 17 behind the abrasive plate 23 to engage the bottom of the cutting bar blade 27 when the rotary spiral sharpener is positioned for action (as shown in Fig. 1). The function of the thumbscrew 26 will be revealed as the description proceeds. A handle 28 is rigidly attached to the rear of the body 17 to provide a coarse adjustment for the rotary spiral blade sharpener and to serve as a convenient carrying means. Springs 29 are mounted at either end of the body 17 to resist clockwise rotation of the arbor frame 16 as viewed in Fig. 4 or, to force the rear of the body 17 away from the arbor frame 16. The springs might well be designed differently than as shown in the drawing without departing from the spirit of the invention but retaining posts 30 fixedly attached to the ends of the body 17 are a convenient mounting means where wire springs 29 are used.

The cutting bar dresser is provided with mounting arms 31 attached to the ends of a guide bar 32. The mounting arms are provided with slots 33 to engage the clevis pivots 11 in a manner similar to the arbor frame 16 of the rotary spiral blade sharpener. Like the legs 18 of the arbor frame 16, the mounting arms 31 are bent to clear the frame extension 15 of the mower and the spiral rotating blades 19. The guide bar 32 is mounted as shown in Fig. 2 so that it rests upon the stationary cutting bar blade 27. The guide bar 32, thus mounted, provides a track upon which the cutting bar dresser may be reciprocated by engagement with the slide 34. The dresser slide 34 is fixedly attached to the back of the dresser block 35. The dresser block 35 is a base upon which is mounted a dresser block jacket 36 having abrasive pockets 37 and a blade rotating lug 38. Abrasive dresser plates 39 are adjustable and removable in the abrasive pockets 37 and preferably consist of short file sections, carborundum blocks, or grit material. The file form has proved most satisfactory, however. The abrasive dresser plates 39 extend below the base of the dresser block 35, the length of extension being adjustable by means of loosening the dresser block jacket 36 and pockets 37. The blade rotating lug 38 also extends below the dresser block jacket 36 and pockets 37. The blade rotating lug 38 also extends below the dresser block base and outwardly (as best indicated in Fig. 6) so as to engage the spiral rotating blades 19 through the cut-out portion 40 of the blade rotating lug 38. Thus, as the cutting bar dresser is manually reciprocated the blade rotating lug 38 moves the spiral rotating blades 19 away from interference with the dressing action of the dresser abrasive plates 39 upon the stationary cutting blade 27. The dresser block 35, the jacket 36, and the abrasive pockets 37, are so canted that the effect of the dresser abrasive plates 39 upon the stationary cutting bar blade 27 will be substantially as indicated in Fig. 7 so that a controlled angle is established on the cutting edge which is held between the limits of two degrees to five degrees. A similar canting can be obtained by varying the angle of engagement of the dresser slide 34 with the guide bar 32 and other designs suggest themselves for giving this angular relationship without a departure from the spirt of this invention.

In operation, a lawnmower which requires sharpening is inverted as shown in Figs. 1 and 2. The clevis 13 and the clevis 14 are clamped into position on the frame extensions 15 so that the clevis pivots 11 are offset from and aligned parallel with the rotary spiral blade shaft 12. The spiral rotary blade sharpener is sprung onto the clevis pivots 11 by snapping the arbor frame legs 18 over the pivots 11 and the sharpener body 17 is placed in engagement with the bottom of the cutting bar blade 27. The abrasive plate 23 overhangs the cutting bar blade 27 but the action of the springs 29 upon the arbor frame 16 and the body 17 hold the abrasive plate 23 in alignment so that it does not interfere with the rotary spiral blades 19 until the body 17 is coarsely adjusted to engage the spiral blades 19 or until the adjusting screw 26 is turned down permitting gradual engagement. A rough adjustment to engagement with the spiral rotary blades 19 is accomplished by forcing up on the handle 28 while manually rotating the blades 19 by rotation of the mower drive wheel 41 until engagement of the blades 19 with the abrasive plate 23 occurs. By rotating the mower drive wheel 41 so that the engagement with the blades 19 reoccurs upon the abrasive plate 23, the blades 19 are all given similar aligned sharpening. A simple method of rotating the blades 19 is to drag the mower with the roller 42 up about the yard with the rotary spiral blade sharpener attached. If the mower is inverted upon blocks supporting the spacer rod 43 a similar result may be achieved by manually rotating the drive wheels 41. As the "high spots" upon the spiral blades 19 are removed, the thumbscrew adjustment 26 can be made to tilt the abrasive plate 23 into greater engagement. It has been found that sharpening the spiral blades 19 in this manner produces a slight bevel upon the cutting edge of the spiral blades 19 complementing the desirable 2 to 5 degree bevel upon the stationary cutting bar blade 27. In like manner it has been discovered that a file is the best form for the abrasive plate 23 since the edge produced upon the spiral blades 19 is minutely serrated thereby, so that the grass tends to be held until sheared, instead of being leaned over by the spiral action of the blades 19 and crushed down.

Subsequent to the sharpening of the rotary spiral blades 19, it is essential for proper sharpening of conventional lawnmowers that the stationary cutting bar blade 27 be dressed to correspond to the mating spiral blades 19. The mounting arms 31 are sprung into position upon the clevis pivots 11 of the clevises 13 and 14 in much the same manner as the arbor frame 16 of the spiral blade sharpener. The attached track or guide bar 32 then rests upon the bottom of the stationary cutting bar 27. The dresser block 35, being provided at its back with a slide 34, is placed in position upon the track 32 with abrasive dresser plates 39 hanging over the edge of the stationary cutting bar blade 27 (as best shown in Fig. 2) and with the blade rotating lug 38 engaged through the cut-out 40 with the nearest spiral rotating blade 19. Thus, the cutting bar blade dresser may be reciprocated manually along the cutting bar blade 27 so as to dress the stationary blade 27 equally along its entire length, the lug 38 assuring that the spiral blades 19 will cause no interference. The dresser block 35 serves as a convenient means for reciprocation and a convenient body for the jacket 36, pockets 37, slide 34, and abrasive dresser plates 39. Through any combination of these components of the cutting bar blade dresser the result sought may be accomplished as indicated in Fig. 7, i. e., the dressing of the cutting bar blade 27 so as to procure a divergence from the vertical of between 2 degrees and 5 degrees. As was found in the abrasive plate 23 on the spiral blade sharpener, files are the most satisfactory dresser abrasive plates 39 because of the slightly serrated surface produced upon the dressed blade 27. As in the case of the abrasive plate 23, the dresser abrasive plates 39 may be reversed and turned over when the surface thereof becomes worn. In addition, the length of overhang in the dresser abrasive plates 39 may be adjusted to distribute wear evenly.

Adjustments are provided upon conventional mowers for then bringing the cutting bar blade 27 into engagement with the rotating spiral blades 19. This adjustment, made in the usual manner after the sharpening and dressing has been done in the manner and by the means hereinbefore described will assure long blade life and extremely satisfactory service from the lawnmower. The invention is aimed at removing the blade misalignment which results in serious damage to mower blades where other portable means have been used to affect sharpening.

It is thus seen that the present invention provides a novel and extremely useful accessory for the home sharpening of conventional mowers with results that equate favorably with factory sharpening through a device that is simple to operate and economical from the standpoint of production and use.

The invention has been described as showing a commercial embodiment thereof. There has been no attempt to show any further adaptations thereof and it is believed that this disclosure will enable those skilled in the art to adapt the invention as may be desired.

I claim:

1. In a portable lawnmower sharpener, for sharpening reel type mowers having a shaft carrying the spiral blade, the combination including: a pair of pivot pins alignably mounted upon each side of a mower frame offset from and parallel with the spiral blade shaft; mounting arms pivotally and removably engaging said pivot pins; a guide bar connected fixedly between said mounting arms and resting on the cutter bar blade; a cutting bar dresser reciprocably and removably mounted upon said guide bar; abrasive plates detachably mounted upon said cutting bar dresser; and a spiral blade rotating lug extending from said dresser.

2. In a portable lawnmower sharpener for spiral bladed lawnmowers, the combination including: a pair of pivot pins alignably mounted upon each side of a lawnmower frame offset from and parallel with a blade shaft in said mower; an arbor frame pivotally and removably engaging said pivot pins; a rigid mounting body pivotal between the legs of said arbor frame and positioned to lie on the lower side of a cutting bar blade of said lawnmower; springs at either end of said mounting body urging said mounting body into engagement with the underside of said cutting bar blade; an adjustment threadable through said mounting body and engageable with said cutting bar blade to tiltably move said mounting body; and a reversible and removable abrasive plate mounted rigidly on the lower surface of said mounting body for tiltably engaging spiral blades of said lawn mower for sharpening.

References Cited in the file of this patent

UNITED STATES PATENTS

| | | |
|---|---|---|
| 617,584 | Leshure | Jan. 10, 1899 |
| 1,027,114 | Ewe et al | May 21, 1912 |
| 1,071,580 | Ring | Aug. 26, 1913 |
| 1,271,778 | Sayre | July 9, 1918 |
| 1,927,630 | Epworth | Sept. 19, 1933 |
| 1,987,348 | Nelson | Jan. 8, 1935 |

FOREIGN PATENTS

| | | |
|---|---|---|
| 520,008 | Great Britain | Apr. 11, 1940 |